United States Patent [19]

Blakely

[11] Patent Number: 5,041,499

[45] Date of Patent: Aug. 20, 1991

[54] IMPACT RESISTANT POLYMER BLENDS

[75] Inventor: Dale M. Blakely, Kingsport, Tenn.

[73] Assignee: Eastman Kodak Company, Rochester, N.Y.

[21] Appl. No.: 611,246

[22] Filed: Nov. 9, 1990

Related U.S. Application Data

[63] Continuation of Ser. No. 361,468, Jun. 5, 1989, abandoned.

[51] Int. Cl.$^5$ .................. C08L 53/02; C08L 67/02
[52] U.S. Cl. .................................. 525/92; 525/95
[58] Field of Search ............................. 525/92, 95

[56] References Cited

U.S. PATENT DOCUMENTS

| | | | |
|---|---|---|---|
| 3,564,077 | 2/1971 | Brinkmann et al. | 260/873 |
| 3,644,574 | 2/1972 | Jackson, Jr. et al. | 263/873 |
| 3,919,353 | 11/1975 | Castelnuovo et al. | 260/873 |
| 4,096,202 | 6/1978 | Farnham et al. | 260/873 |
| 4,117,034 | 9/1978 | Steffancin | 260/873 |
| 4,301,255 | 11/1981 | Korpman | 525/92 |
| 4,349,469 | 9/1982 | Davis et al. | 524/765 |
| 4,352,907 | 10/1982 | Lee | 524/537 |
| 4,485,204 | 11/1984 | Nabors | 525/92 |
| 4,582,876 | 4/1986 | Weemes et al. | 525/64 |
| 4,657,970 | 4/1987 | Shiraki et al. | 525/92 |

FOREIGN PATENT DOCUMENTS

| | | |
|---|---|---|
| 295860 | 6/1985 | Austria . |
| 3332325 | 3/1985 | Fed. Rep. of Germany . |
| 53-071155 | 6/1978 | Japan . |

OTHER PUBLICATIONS

Patent Abstracts of Japan, Abstract No. 162124982; and JP-A-62124928 (Asahi Chem. Ind. Co. Ltd.) 06.06.1987 (the whole abstract).

Patent Abstracts of Japan, Abstract No. 62034945; and JP-A-62034945 (Asahi Chem. Ind. Co. Ltd.) 14.02.1987 (the whole abstract).

*Primary Examiner*—Allan M. Lieberman
*Attorney, Agent, or Firm*—John F. Stevens; William P. Heath, Jr.

[57] ABSTRACT

Disclosed is a polymer blend having improved low-temperature impact strength comprising a copolyester of terephthalic acid, ethylene glycol and 1,4-cyclohexanedimethanol, and a styrene-butadiene block copolymer.

6 Claims, No Drawings

IMPACT RESISTANT POLYMER BLENDS

This is a continuation of copending application Ser. No. 07/361,468 filed on June 5, 1989, now abandoned.

TECHNICAL FIELD

This invention relates to blends of styrene-butadiene copolymers with certain terephthalic acid based polyesters which have improved low-temperature impact strengths. These blends are useful as molding compositions.

BACKGROUND OF THE INVENTION

There is a need for tough, inexpensive thermoplastics that can be injection molded for use in applications such as household items. Styrene-butadiene copolymers and polyesters of terephthalic acid and ethylene glycol or copolyesters of terephthalic acid, ethylene glycol, and cyclohexanedimethanol meet most of these requirements, but have low impact strengths, especially at low temperatures. It has now been discovered that blends of styrene-butadiene copolymers with the above polyesters or copolyesters have unexpectedly high low-temperature impact strengths while maintaining other physical properties.

U.S. Pat. No. 4,582,876 dated Apr. 15, 1986 by D. A. Weemes and R. W. Seymour of Eastman Kodak describes blends of copolyesters and styrene-butadiene-maleic anhydride copolymers that have high impact at low temperatures. That disclosure did not make the present discovery obvious, however, since that styrenic polymer had rubbery inclusions that were believed to cause the high impact strengths of the blends. The morphology of the styrene-butadiene copolymer of the present invention is not similar to that disclosed in the '876 patent and was not expected to result in high impact strengths when blended with polyesters.

Also of interest are U.S. Pat. Nos. 4,117,034; 3,644,574; 4,352,907; 3,564,077; 4,096,202; 3,919,353; German Patent No. 3,332,325 and Japanese Patent No. 5371155.

DESCRIPTION OF THE INVENTION

According to the present invention there are provided polymer blends which have improved low-temperature impact strengths comprising
(a) about 20-95 wt % of a polyester having an I.V. of about 0.5-1.0 dl/g and containing repeat units from an acid component of at least 80 mol % terephthalic acid, and a glycol component of about 25-100 mol % ethylene glycol and 75-0 mol % 1,4-cyclohexane-dimethanol, and
(b) about 80-5 wt % of a styrene-butadiene block copolymer containing about 10-40 wt % repeat units from butadiene, said copolymer having a flow rate of 6-12 g/10 min.

The polyester or copolyester (herein sometimes collectively referred to as "polyester") used in the present invention may be a polyester based substantially on ethylene glycol and terephthalic acid monomer units or may be copolymers having up to about 75 mol % monomer units from 1,4-cyclohexanedimethanol. Minor amounts (up to about 10 mol %) of other comonomers may also be used. If comonomers are used, preferred comonomers include isophthalic acid, naphthalenedicarboxylic acid, cyclohexanedicarboxylic acid, succinic acid, sebacic acid, adipic acid, ethylene glycol, diethylene glycol, butanediol, hexanediol, and neopentyl glycol, for example.

The polyester used in the present invention preferably has an inherent viscosity which is greater than about 0.5, preferably about 0.5-1.0 and most preferably, about 0.7-0.8 dl/g. The polyesters may be made by conventional, well known techniques, and many are commercially available.

The styrene-butadiene block copolymers useful in the blends of this invention are those having repeat units from about 10-40 wt % butadiene and about 90-60 wt % styrene, and a melt flow rate of 6-12 g/10 min. Such copolymers may be produced using conventional copolymerization processes, and many are commercially available such as, for example, KR03 K-Resin from Phillips.

The blends can be melt blended and injection molded on conventional processing equipment. The resulting parts have unexpectedly good low-temperature impact strengths and good tensile strength, ductility, flexural properties, and heat distortion temperatures. For the blends described here, all ratios of the components have higher 0° C. notched Izod impact values than do either of the neat components. These blends are useful as injection molded articles with good toughness and ductility.

The following examples are submitted for a better understanding of the invention. In the examples, KR03 K-Resin, a styrene-butadiene block copolymer (SB copolymer) having repeat units from about 20 wt % butadiene and about 30 wt % styrene, having a melt flow rate of 8 is used. Polyester A is a polyester having repeat units from terephthalic acid and ethylene glycol having an I.V. of 0.705. Copolyester B is a copolyester having repeat units from terephthalic acid, about 30 mol % 1,4-cyclohexanedimethanol and about 70 mol % ethylene glycol, having an I.V. of 0.75 and Copolyester C is a copolyester of terephthalic acid, about 70 mol % 1,4-cyclohexanedimethanol and about 30 mol % ethylene glycol.

The blends contain 25, 50, and 75 wt % K-Resin. They are melt-compounded on a twin-screw Werner & Pfleiderer extruder and injection molded on a Boy 22S machine at 240°-260° C. The mechanical properties are shown in Tables 1-3. The 0° C. notched Izods are shown in FIGS. 1-3. In each case, the 0° C. notched Izod impact strength of the blends are unexpectedly higher than the impact strengths of either of the neat components. These remarkable impact strengths of the blends are clearly achieved while maintaining good tensile and flexural properties.

In the table, the letters C, P and N under impact strengths have the following meanings:
C - complete break
P - partial break
N - no break

TABLE 1

| | BLENDS OF SB COPOLYMER WITH POLYESTER A | | | | |
|---|---|---|---|---|---|
| | 1* | 2* | 3* | 4* | 5* |
| Molding Temperature, °C. | 240 | 240 | 260 | 260 | 270 |
| Injection Pressure, psig | 500 | 500 | 500 | 500 | 600 |

TABLE 1-continued

BLENDS OF SB COPOLYMER WITH POLYESTER A

|  | 1* | 2* | 3* | 4* | 5* |
|---|---|---|---|---|---|
| Tensile ASTM D638 | | | | | |
| Yield Stres, 10E3 psi | 3.62 | 4.41 | 5.30 | 6.78 | 7.93 |
| Break Stress, 10E3 psi | 3.90 | 4.89 | 5.81 | 3.84 | 10.11 |
| Yield Elongation, % | 3 | 3 | 3 | 4 | 4 |
| Break Elongation, % | 158 | 175 | 221 | 62 | 307 |
| Flexural ASTM D790 | | | | | |
| Strength, 10E3 psi | 4.83 | 6.07 | 7.79 | 9.67 | 12.50 |
| Modulus, 10E5 psi | 2.03 | 2.26 | 2.61 | 3.11 | 3.74 |
| Notched Izod Impact Strength, ft lb/in. ASTM D256 | | | | | |
| 23° C. | .49 C | 1.28 C | 1.06 C | .98 C | .75 C |
| 0° C. | .38 C | .96 C | 1.31 C | .89 C | .83 C |
| −40° C. | .42 C | .48 C | .65 C | .59 C | .81 C |
| Unnotched Izod Impact Strength, ft lb/in. ASTM D256 | | | | | |
| 23° C. | 25.77 N | 30.73 N | 38.05 N | 41.54 N | 45.32 N |
| 0° C. | 25.81 N | 31.64 N | 40.66 N | 47.97 N | 48.31 N |
| −40° C. | 11.07 C | 17.54 C | 13.93 C | 23.93 C | 50.57 3N, 2C |

*1 SB Copolymer
2 75% SB Copolymer, 25% Polyester A
3 50% SB Copolymer, 50% Polyester A
4 25% SB Copolymer, 75% Polyester A
5 Polyester A

TABLE 2

BLENDS OF SB COPOLYMER AND COPOLYESTER B

|  | 1* | 2* | 3* | 4* | 5* |
|---|---|---|---|---|---|
| Molding Temperature, °C. | 240 | 240 | 240 | 240 | 240 |
| Injection Pressure, psig | 400 | 400 | 400 | 400 | 400 |
| Tensile ASTM D638 | | | | | |
| Yield Stres, 10E3 psi | 3.75 | 3.87 | 4.96 | 5.80 | 7.74 |
| Break Stress, 10E3 psi | 4.62 | 5.08 | 5.96 | 4.92 | 8.84 |
| Yield Elongation, % | 3 | 3 | 3 | 4 | 4 |
| Break Elongation, % | 185 | 183 | 187 | 185 | 112 |
| Flexural ASTM D790 | | | | | |
| Strength, 10E3 psi | 4.48 | 6.10 | 7.70 | 9.25 | 11.78 |
| Modulus, 10E5 psi | 2.35 | 2.37 | 2.55 | 2.72 | 3.13 |
| Notched Izod Impact Strength, ft lb/in. ASTM D256 | | | | | |
| 23° C. | .70 C | 9.14 P | 7.57 3P, 2C | 5.71 2P, 3C | 1.20 C |
| 0° C. | .68 C | 1.43 C | 1.62 C | 1.85 C | 1.31 C |
| −40° C. | .44 C | .61 C | 1.17 C | 1.25 C | .74 C |
| Unnotched Izod Impact Strength, ft lb/in. ASTM D256 | | | | | |
| 23° C. | 25.08 N | 31.85 N | 34.11 N | 41.23 N | 42.66 N |
| 0° C. | 30.57 N | 34.31 N | 47.32 N | 40.98 4N, 1P | 34.33 N |
| −40° C. | 28.77 N | 35.41 N | 47.02 N | 49.50 N | 44.81 N |

*1 SB Copolymer
2 75% SB Copolymer, 25% Copolyester B
3 50% SB Copolymer, 50% Copolyester B
4 25% SB Copolymer, 75% Copolyester B
5 Copolyester B

TABLE 3

BLENDS OF SB COPOLYMER AND COPOLYESTER C

|  | 1* | 2* | 3* | 4* | 5* |
|---|---|---|---|---|---|
| Molding Temperature, °C. | 240 | 260 | 260 | 260 | 260 |
| Injection Pressure, psig | 400 | 400 | 400 | 400 | 400 |
| Tensile ASTM D638 | | | | | |
| Yield Stres, 10E3 psi | 3.75 | 3.87 | 4.56 | 4.42 | 6.42 |
| Break Stress, 10E3 psi | 4.62 | 4.97 | 5.66 | 5.68 | 6.43 |
| Yield Elongation, % | 3 | 3 | 4 | 4 | 4 |
| Break Elongation, % | 185 | 162 | 150 | 160 | 93 |
| Flexural ASTM D790 | | | | | |
| Strength, 10E3 psi | 4.48 | 5.83 | 7.19 | 8.48 | 10.23 |
| Modulus, 10E5 psi | 2.35 | 2.18 | 2.16 | 2.45 | 2.53 |
| Notched Izod Impact Strength, ft lb/in. ASTM D256 | | | | | |
| 23° C. | .70 C | 9.11 P | 15.19 N | 20.64 P | 30.32 N |
| 0° C. | .68 C | 2.44 1P, 4C | 13.85 N | 13.52 4N, 1C | 2.10 C |
| −40° C. | .44 C | .82 C | 2.49 C | 3.43 C | 1.10 C |
| Unnotched Izod Impact Strength, | | | | | |

TABLE 3-continued

| BLENDS OF SB COPOLYMER AND COPOLYESTER C | | | | | |
|---|---|---|---|---|---|
| | 1* | 2* | 3* | 4* | 5* |
| ft lb/in. ASTM D256 | | | | | |
| 23° C. | 25.08 N | 29.84 N | 36.18 N | 36.67 N | 40.73 N |
| 0° C. | 30.57 N | 36.07 N | 40.80 N | 46.31 N | 50.49 N |
| −40° C. | 28.77 N | 34.35 N | 46.36 N | 50.00 N | 60.50 N |

*1 SB Copolymer
2 75% SB Copolymer, 25% Copolyester C
3 50% SB Copolymer, 50% Copolyester C
4 25% SB Copolymer, 75% Copolyester C
5 Copolyester C The tests used herein for determination of mechanical properties are described as follows:

| Melt Flow Rate or Index | ASTM D1238-79 |
|---|---|
| Tensile Strength at Fracture | ASTM D638-80- |
| Elongation at Fracture | ASTM D638-80 |
| Flexural Modulus | ASTM D790-80 |
| Flexural Strength | ASTM D790-80 |
| Izod Impact | ASTM D256-81 |
| Heat Deflection Temperature, °C. | ASTM D648-72 |

Unless otherwise specified, all parts, percentages, ratios, etc., are by weight. Weight of reinforcing glass fibers and nucleating agent(s) are based on total composition weight.

The invention has been described in detail with particular reference to preferred embodiments thereof, but it will be understood that variations and modifications can be effected within the spirit and scope of the invention.

I claim:

1. A polymer blend having improved low-temperature impact strength comprising (a) about 20–95 wt % of a polyester having an I.V. of about 0.5–1.0 dl/g and containing repeat units from an acid component of at least 80 mol % terephthalic acid, and a glycol component of about 25–100 mol % ethylene glycol and 75–0 mol % 1,4-cyclohexanedimethanol, and (b) about 80–5 wt % of a styrene-butadiene block copolymer containing about 10–40 wt % repeat units from butadiene, said copolymer having a flow rate of 6–12 g/10 min.

2. The polymer blend according to claim 1 wherein said polyester has repeat units from an acid component consisting essentially of terephthalic acid and a glycol component consisting essentially of ethylene glycol.

3. The polymer blend according to claim 1 wherein said polyester has repeat units from an acid component consisting essentially of terephthalic acid and a glycol component consisting essentially of ethylene glycol and 1,4-cyclohexanedimethanol.

4. A molded article comprising the polymer blend of claim 1.

5. A molded article comprising the polymer blend of claim 2.

6. A molded article comprising the polymer blend of claim 3.

* * * * *